Patented July 4, 1939

2,165,151

UNITED STATES PATENT OFFICE 2,165,151

PRODUCTION OF ASCORBIC ACID AND ITS ISOMERS

Richard Pasternack, Brooklyn, N. Y., and Peter P. Regna, North Bergen, N. J., assignors to Charles Pfizer & Company, Brooklyn, N. Y., a corporation of New Jersey No Drawing. Application July 15, 1938,
Serial No. 219,404

4 Claims. (Cl. 260—344)

This invention relates to the production of ascorbic acid and its isomers and has for its object to provide a simple and efficient process for this purpose.

It is known in the art that esters of 2-keto-aldonic acids such as 2-keto-d-gluconic acid and 2-keto-l-gulonic acid are converted to saccharosonic acids (such as ascorbic acid and isoascorbic acid) by the action of either acids or alkalies. Maurer & Schiedt (Berichte 67B: 1239–41, 1934) and Heinz Ohle (Angewandte Chemie, vol. 46, No. 25, pages 399–400, 1933) converted the methyl ester of 2-keto-d-gluconic acid to d-isoascorbic acid by the action of sodium methylate. It is furthermore stated in Swiss Patent No. 187,933 that esters of 2-keto-l-gulonic acid may be converted to l-ascorbic acid in the presence of strong mineral acids such as HCl and $H_2SO_4$.

We have now found that these esters may be converted in aqueous solution to the corresponding ascorbic type acids by the action of certain metals without the addition of an alkaline or acid substance. The reaction takes place at room temperature (for instance, using manganese a 20% conversion may be obtained in 24 hours) but it is greatly accelerated by raising the temperature.

Insofar as we have been able to determine, this action is without parallel. While many metals have little or no effect, iron, nickel, cobalt, manganese, cadmium and zinc are suitable. On the other hand, such a well known reaction-promoter as platinum has no effect, and also aluminum and amalgamated aluminum are ineffective. In the absence of metals, esters of 2-keto-gulonic acid and 2-keto-gluconic acid may be boiled in water for considerable periods without any substantial degree of either conversion or destruction.

Example 1

15 grams of iron powder are added to a solution of 41.6 grams methyl 2-keto-l-gulonate in one liter of water. The mixture is then boiled under reflux in a nitrogen atmosphere. After 1.5 hours an analysis, by iodine titration, shows 76% as l-ascorbic acid. The reaction mixture also contains 2-keto gulonic acid and small amounts of unchanged ester. The excess metallic iron is filtered off, and the filtrate is treated with calcium ferrocyanide to precipitate the dissolved iron. The iron ferrocyanide compound is filtered off and sufficient oxalic acid is added to remove the calcium. The calcium oxalate is removed by filtration, and the filtrate is subsequently evaporated to a thick syrup under reduced pressure. The residue is taken up with 50 cc. of ethanol, and again evaporated to a thick syrup. The residue crystallizes rapidly upon the addition of a few crystals of l-ascorbic acid.

The major portion of ascorbic acid is obtained by fractional crystallization; it has a melting point of 190–192° C. and analyzes 99.0% ascorbic acid by an iodine titration. A solution of 10 grams in 100 cc. has a rotation $[a]_D = +21.0$.

The mother liquor containing the 2-keto-gulonic acid, following the ascorbic acid crystallizations, can be evaporated to dryness, reesterified to the methyl-2-keto-gulonate, and the above procedure repeated.

Example 2

10 grams of 2-keto-l-gulonic methyl ester are dissolved in 250 cc. water and refluxed with 2 grams metallic manganese powder for 15 minutes. An iodine titration then shows 75% of the theoretical conversion to l-ascorbic acid. The reaction mixture is filtered and the dissolved manganese precipitated with calcium ferrocyanide. The ascorbic acid is recovered as in Example 1.

Example 3

41.6 grams 2-keto-d-gluconic methyl ester are dissolved in 1000 cc. water and boiled with 20 grams of iron filings for 1½ hours. At the end of this time, an iodine titration shows 45% conversion to d-isoascorbic acid. After recovering the iron in solution as in Example 1, the isoascorbic acid is recovered by alcohol crystallization. It has a melting point of 168–170° C. and a solution containing 10 grams in 100 cc. has a rotation $[a]_D = -17.7$.

Example 4

10 grams 2-keto-l-gulonic methyl ester are dissolved in 250 cc. water and heated on the steam bath in the presence of 2 grams zinc dust. After 2 hours the conversion, as indicated by iodine titration, is 40% ascorbic acid.

Example 5

5 grams 2-keto-l-gulonic methyl ester in 200 cc. water are boiled with 2 grams finely divided nickel. After 1 hour the iodine titration shows 68% conversion to ascorbic acid. The reaction mixture is worked up as in Example 1 by removing the nickel as ferrocyanide.

Example 6

5 grams 2-keto-l-gulonic methyl ester in 200 cc. water are boiled with 2 grams cadmium powder for 45 minutes. The conversion is then 57%. The cadmium in solution may be removed with hydrogen sulfide and the ascorbic acid separated by alcohol crystallization.

Example 7

10 grams 2-keto-gulonic methyl ester in 250 cc. water are boiled with 2 grams of powdered cobalt metal for 2½ hours. The conversion is 47%. The cobalt in solution may be recovered as ferrocyanide, and the ascorbic recovered by crystallization from alcohol.

Example 8

10 grams of 2-keto-d-gluconic acid methyl ester in 250 cc. of water are boiled under reflux with 1.2 grams of powdered metallic manganese for 45 minutes. The yield of d-isoascorbic acid as shown by iodine titration is 50%. The reaction mixture is filtered and the dissolved manganese precipitated with calcium ferrocyanide. The isoascorbic acid is recovered as in Example 3.

The invention claimed is:

1. Process for the conversion of esters of 2-keto-hexonic acids to the corresponding saccharosonic acids by treating esters of the 2-keto acids in aqueous solution in the presence of a metal selected from the group consisting of iron, nickel, cobalt, manganese, cadmium and zinc.

2. Process for converting the esters of 2-ketohexonic acids to the corresponding saccharosonic acids by heating same in aqueous solution in the presence of a metal selected from the group consisting of iron, nickel, cobalt, manganese, cadmium and zinc.

3. Process for producing l-ascorbic acid which comprises subjecting an ester of 2-keto-l-gulonic acid in aqueous solution to the action of a metal selected from the group consisting of iron, nickel, cobalt, manganese, cadmium and zinc.

4. Process for producing l-ascorbic acid which comprises heating the methyl ester of 2-keto-l-gulonic acid in aqueous solution in the presence of a metal selected from the group consisting of iron, nickel, cobalt, manganese, cadmium and zinc.

RICHARD PASTERNACK.
PETER P. REGNA.

---

Certificate of Correction

Patent No. 2,165,151.      July 4, 1939.

RICHARD PASTERNACK ET AL.

It is hereby certified that errors appear in the printed specification of the above numbered patent requiring correction as follows: Page 1, first column, lines 7, 16, 43; same page, second column, lines 18, 40, 47, 55; and page 2, second column, line 14, claim 3, and line 19, claim 4, for "2-keto-1-" read *2-keto-l-*; page 1, first column, lines 17 and 47; same page, second column, lines 5 and 22; page 2, second column, line 13, claim 3, and line 18, claim 4, for "1-ascorbic" read *l-ascorbic*; and that the said Letters Patent should be read with these corrections therein that the same may conform to the record of the case in the Patent Office.

Signed and sealed this 22d day of August, A. D. 1939.

[SEAL]      Leslie Frazer

*Acting Commissioner of Patents.* cc. water are boiled with 2 grams cadmium powder for 45 minutes. The conversion is then 57%. The cadmium in solution may be removed with hydrogen sulfide and the ascorbic acid separated by alcohol crystallization.

*Example 7*

10 grams 2-keto-gulonic methyl ester in 250 cc. water are boiled with 2 grams of powdered cobalt metal for 2½ hours. The conversion is 47%. The cobalt in solution may be recovered as ferrocyanide, and the ascorbic recovered by crystallization from alcohol.

*Example 8*

10 grams of 2-keto-d-gluconic acid methyl ester in 250 cc. of water are boiled under reflux with 1.2 grams of powdered metallic manganese for 45 minutes. The yield of d-isoascorbic acid as shown by iodine titration is 50%. The reaction mixture is filtered and the dissolved manganese precipitated with calcium ferrocyanide. The isoascorbic acid is recovered as in Example 3.

The invention claimed is:

1. Process for the conversion of esters of 2-keto-hexonic acids to the corresponding saccharosonic acids by treating esters of the 2-keto acids in aqueous solution in the presence of a metal selected from the group consisting of iron, nickel, cobalt, manganese, cadmium and zinc.

2. Process for converting the esters of 2-keto-hexonic acids to the corresponding saccharosonic acids by heating same in aqueous solution in the presence of a metal selected from the group consisting of iron, nickel, cobalt, manganese, cadmium and zinc.

3. Process for producing l-ascorbic acid which comprises subjecting an ester of 2-keto-l-gulonic acid in aqueous solution to the action of a metal selected from the group consisting of iron, nickel, cobalt, manganese, cadmium and zinc.

4. Process for producing l-ascorbic acid which comprises heating the methyl ester of 2-keto-l-gulonic acid in aqueous solution in the presence of a metal selected from the group consisting of iron, nickel, cobalt, manganese, cadmium and zinc.

RICHARD PASTERNACK.
PETER P. REGNA.

Certificate of Correction

Patent No. 2,165,151.  July 4, 1939.

RICHARD PASTERNACK ET AL.

It is hereby certified that errors appear in the printed specification of the above numbered patent requiring correction as follows: Page 1, first column, lines 7, 16, 43; same page, second column, lines 18, 40, 47, 55; and page 2, second column, line 14, claim 3, and line 19, claim 4, for "2-keto-1-" read *2-keto-l-*; page 1, first column, lines 17 and 47; same page, second column, lines 5 and 22; page 2, second column, line 13, claim 3, and line 18, claim 4, for "1-ascorbic" read *l-ascorbic*; and that the said Letters Patent should be read with these corrections therein that the same may conform to the record of the case in the Patent Office.

Signed and sealed this 22d day of August, A. D. 1939.

[SEAL]

Leslie Frazer

*Acting Commissioner of Patents.*